(12) United States Patent
Ohara

(10) Patent No.: US 7,715,450 B2
(45) Date of Patent: May 11, 2010

(54) SIDEBAND BUS SETTING SYSTEM AND METHOD THEREOF

(75) Inventor: Shigeyoshi Ohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 11/528,696

(22) Filed: Sep. 28, 2006

(65) Prior Publication Data
US 2007/0112984 A1    May 17, 2007

(30) Foreign Application Priority Data
Nov. 14, 2005    (JP)    ............... 2005-328825

(51) Int. Cl.
*H04J 3/04*    (2006.01)
(52) U.S. Cl. ............... 370/536; 370/252
(58) Field of Classification Search ......... 370/255–258, 370/532–545
See application file for complete search history.

(56) References Cited

U.S. PATENT DOCUMENTS 5,878,234 A * 3/1999 Dutkiewicz et al. ......... 710/110
5,897,663 A * 4/1999 Stancil ..................... 711/200
7,391,788 B2 * 6/2008 Zhang et al. ............... 370/438
2005/0120246 A1 * 6/2005 Jang et al. .................. 713/201

FOREIGN PATENT DOCUMENTS

JP    10-207834    8/1998

* cited by examiner

*Primary Examiner*—Phuc Tran
(74) *Attorney, Agent, or Firm*—Staas & Halsey LLP

(57) ABSTRACT

A sideband bus setting system in which multiple target devices (ICs) are communicably connected to a master device through a bus so as to set data to ICs mounted on an electronic device. The target device is provided with a target domain ID identifying a target domain-which is a subgroup of multiple target devices, and the master device is provided with the same target domain ID as that provided for the target device. The master device receives the target domain ID from the target device, and performs data-setting process to the target device when the target domain ID received from the target device coincides with the target domain ID provided for the master device. According to the above feature, the failure of the bus (for example, the failure of a sideband multiplexer) can be detected in advance, thereby preventing overlooking the improper data-setting operation.

15 Claims, 11 Drawing Sheets

SIDEBAND BUS SETTING SYSTEM AND METHOD THEREOF

BACKGROUND OF THE INVENTION

1. Field of the Invention

The present invention relates to a sideband bus setting system used for setting an integrated circuit (IC) which is mounted on an electronic device, or for reading out the state of the IC.

More particularly, the present invention has been made to configure the circuit to avoid that an improper setting of the IC or an improper readout of the state of the IC is performed by a sideband bus such as the Inter-Integrated Circuit (I2c) bus or the Two Wire Interface (TWI) due to an abnormal path.

2. Description of the Related Art

As the size of a computer such as a server has increased, the types and the number of ICs which are mounted on a unit of the computer have increased. Accordingly, it has become difficult to implement a consistent setting of all ICs through a main processor by using a main data path, and many ICs have a port for a sideband bus to perform the setting through a path different from the data path before the main processor starts access.

As standards of such sideband bus, the I2C which was proposed by Philips Semiconductors or the TWI (two-wire serial interface), which is a generalized standard of the I2C, is often used. The I2C operates in half-duplex and multi-dropped connection at a low speed from 100 KHz to 400 KHz, and is controlled by only two signal lines named SDA (serial data) and SCL (serial clock).

FIG. 1 illustrates an example of systems which are connected via the I2C bus. According to the I2C standard, a plurality of master devices can exist. However, generally, it is configured that a plurality of target devices 3 are connected to a master device 1 through I2C bus 4, as shown in FIG. 1. A unique device address has to be set to each of the target devices 3.

The setting of the device address depends on the ICs (or target devices). Some ICs have a fixed address and an address of some ICs can be arbitrarily set through an external pin, and the setting of the device address is performed depending on each target device or according to the specification of each target device.

In the example shown in FIG. 1, digits in a target device 3 indicate a device address in binary digit, in which the lower two digits (part indicated by boldface) indicate bits that can be arbitrarily set through an external pin 5. For example, #00 and #01 in the target device 3 are similar devices and the upper five digits out of seven digits are fixed. In the case of #00 of the target device 3, by connecting two address setting external pins to GNDs, the lower two bits is set to "00". In the case of #01 of the target device 3, by connecting one address setting external pin to GND and another address setting external pin to VDD, the lower two bits is set to "01". In the case of #30 of the target device 3, all of the seven bit addresses are fixed and any bits of the seven bit addresses cannot be arbitrarily set through external pins.

"The I2C-Bus Specification Version 2.1" is an example of the specifications of the sideband bus.

As described above, it is possible to connect 128 devices (two raised to seventh power) to an I2C bus according to the protocol. However, if the target device actually has only two bits for the address setting external pins, for example as shown in FIG. 1, there is a limitation that the number of target devices 3 coupled to the master device 1 through the sideband bus 4 is equal to or smaller than four (two raised to second power).

SUMMARY OF THE INVENTION

The present invention provides a method and a system for suppressing the limitation of the number of target devices connected to a sideband bus, and for setting data to target devices reliably and at low cost.

According to the present invention, there is provided a method and system for setting data to a plurality of target devices through a sideband bus.

According to one aspect of the present invention, there is provided a method comprising setting in a target device communicably connected by a bus to a master device, a target domain ID identifying a target domain which is a subgroup of a plurality of target devices, storing the target domain ID in the master device, receiving by the master device via the bus the target domain ID from the target device, and performing by the master device data-setting process to the target device when the target domain ID received from the target device coincides with the target domain ID stored in the master device.

According to another aspect of the present invention, there is provided a method further comprising dividing the plurality of target devices into a plurality of target domains, a unique address being assigned to each target device in a target domain of the plurality of target domains, and providing a sideband multiplexer connecting the master device to a master port of the sideband multiplexer, and connecting the target domain to one of target ports of the sideband multiplexer, wherein the target domain ID comprises ID information identifying the target port of the sideband multiplexer to which the target domain is connected.

According to the present invention, the failure of the sideband bus, for example the failure of a sideband multiplexer, can be detected in advance and it is possible to prevent overlooking the improper data setting to the target devices due to the failure.

DESCRIPTION OF THE PREFERRED EMBODIMENTS

The embodiment of the present invention is disclosed herein.

Figure 2:
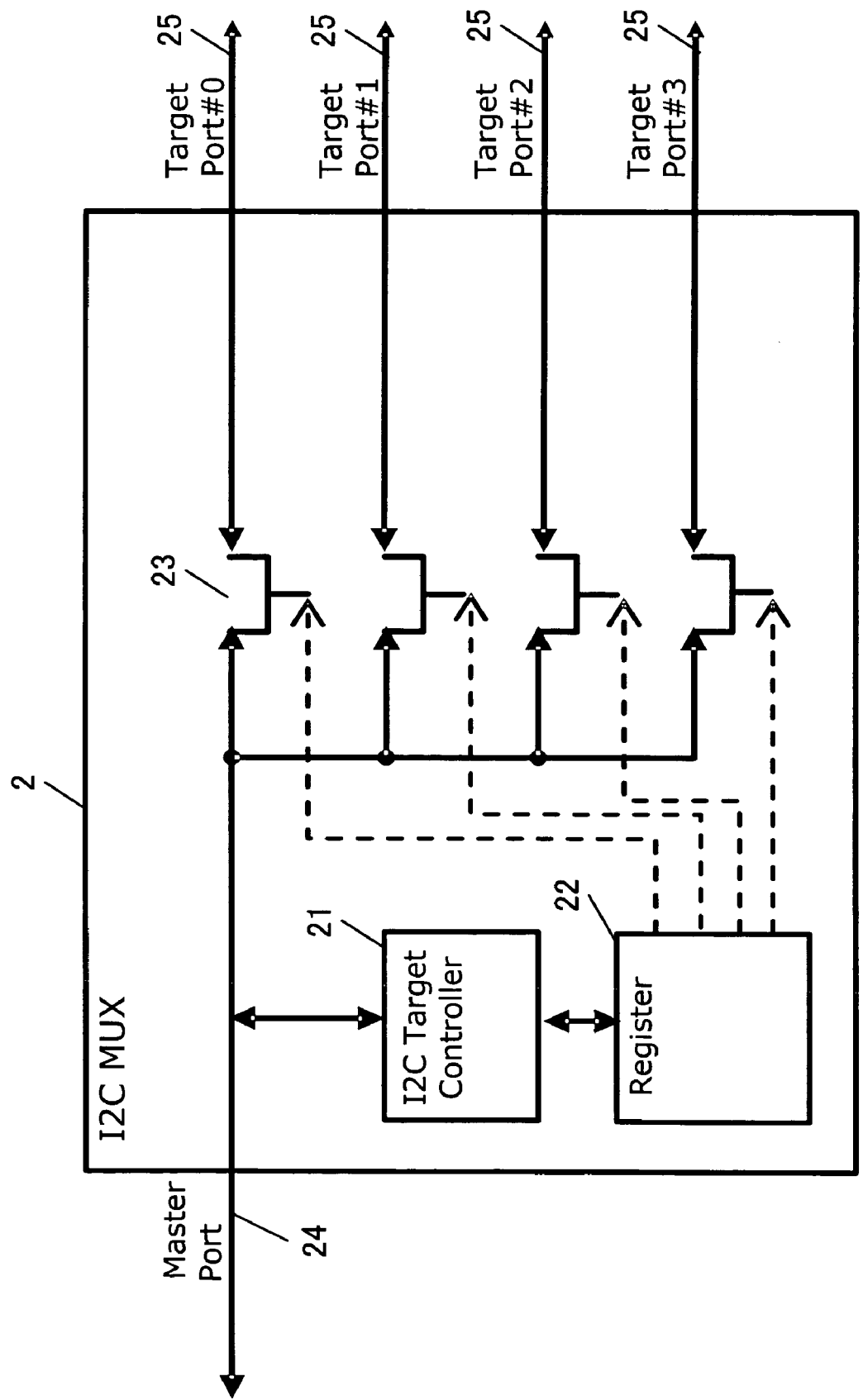
FIG. 2 is an explanatory diagram of a sideband multiplexer according to an embodiment of the present invention.

FIG. 2 is an explanatory diagram of a sideband multiplexer, according to an embodiment of the present invention.

To solve the problem that the number of target devices connected to a sideband bus is limited, for example, an I2C-MUX 2, which is a sideband multiplexer, is provided.

Figure 1:
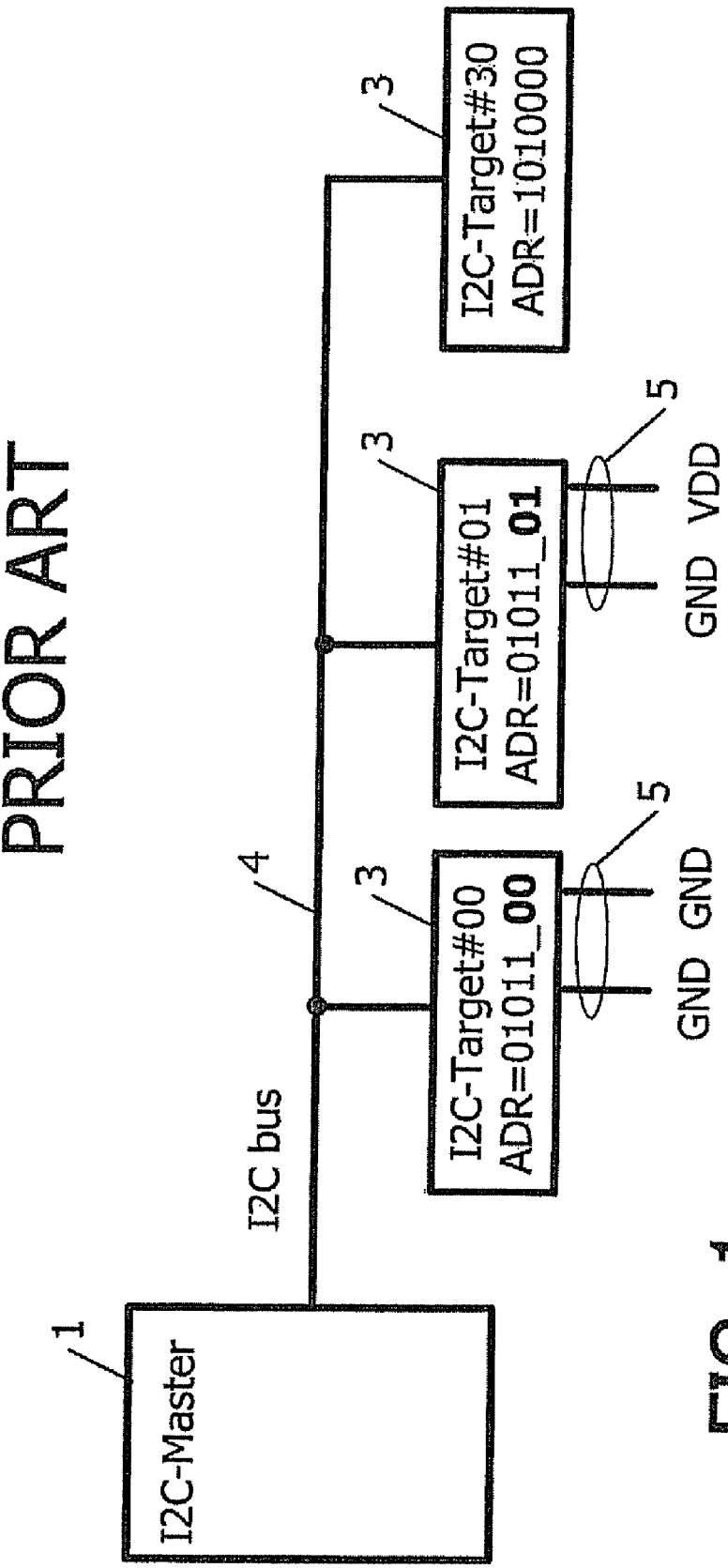
FIG. 1 is an explanatory diagram of a sideband bus configuration.

The I2C-MUX 2 itself is an I2C target device 3 of FIG. 1, and an internal register 22 can be set by the master device 1 of FIG. 1 via a master port 24 connected to the I2C bus 4 of FIG. 1. The I2C-MUX 2 has the master port 24 and a plurality of target ports 25, and if the I2C-MUX 2 itself is not a target of data-setting process, it has a function to allow a signal to pass between one of the target ports 25 and the master port 24 according to the setting of the internal register 22.

The master device 1 of FIG. 1 is connected to the master port 24 and target devices 3 of FIG. 1 are connected to target ports 25. An I2C target controller 21 sets the internal register (port designation register) 22 according to a command data which is transmitted from the master device 1 to the I2C-MUX 2 via the master port 24. The I2C target controller 21 selectively connects the master port 24 to one of the four target ports 25 (#0, #1, #2, #3) through transmission gates 23 on the basis of the values set to the internal register 22. That is, one of these transmission gates 23 becomes a connected state. According to an aspect of the embodiments, the number of I2C-MUX 2 target ports 25 is not limited to four and any number of such target ports can be provided.

As a result, the I2C-MUX 2 can divide multiple target devices into a plurality of subgroups each connected to one of the target ports 25 of the I2C-MUX 2, and it is possible to assign the same device address to multiple target devices each belonging to a different subgroup. The above mentioned subgroup of target devices is hereinafter described as a target domain.

Figure 3:
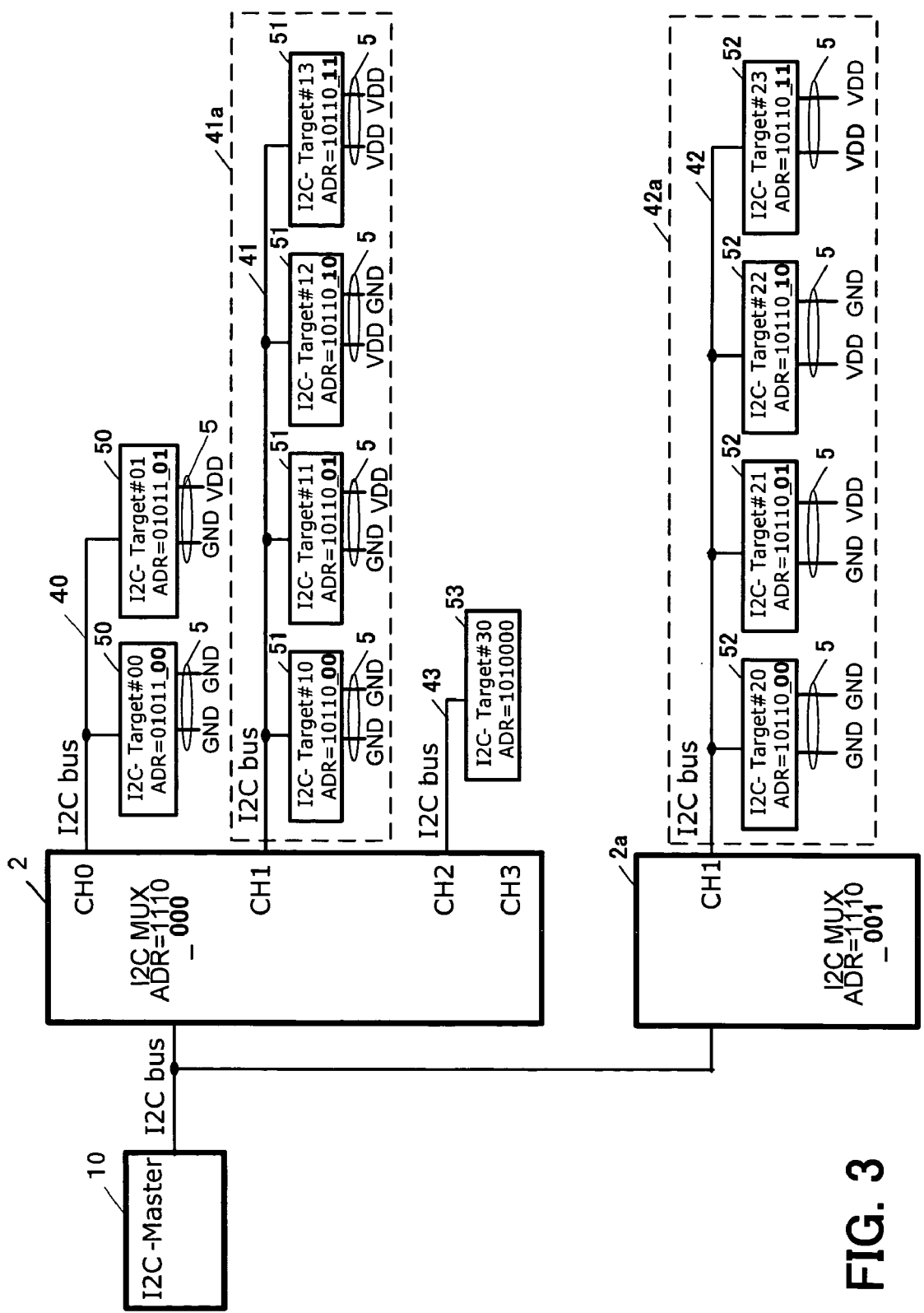
FIG. 3 illustrates an exemplary use of a sideband multiplexer according to a first embodiment of the present invention.

FIG. 3 illustrates an exemplary use of a sideband multiplexer according to a first embodiment of the present invention.

Target devices 50 (#00-#01) are coupled to a master device 10 (I2C-Master 10) through a bus including a sideband multiplexer 2 (an I2C-MUX 2) and a side band bus 40 (I2C bus 40) connected to a target port CH0 of the I2C-MUX 2. A target device 53 (#30) is coupled to the master device 10 (I2C-Master 10) through a bus including the sideband multiplexer 2 (I2C-MUX 2) and a side band bus 43 (an I2C bus 43) connected to a target port CH2 of the I2C-MUX 2. Target devices 51 (#10-#13) are coupled to the master device 10 (I2C-Master 10) through a bus including the sideband multiplexer 2 (I2C-MUX 2) and a side band bus 41 (I2C bus 41) connected to a target port CH1 of the I2C-MUX 2. While, target devices 52 (#20-#23) are coupled to the target device 10 (I2C-Master 10) through a bus including a sideband multiplexer 2a (I2C-MUX 2a) and a side band bus 42 (I2C bus 42) connected to a target port CH1 of the I2C-MUX 2a.

As shown in FIG. 3, the number of the I2C-MUXs can be increased and I2C target devices 51 and 52 of the same type are allocated to the different I2C-MUXs 2 and 2a, respectively. That is to say, target domains 41a and 42a are connected to the I2C-MUXs 2 and 2a, respectively.

In the case of FIG. 3, by using two side band multiplexers (I2C-MUXs) 2 and 2a, it is possible to divide multiple target devices 51 (#10-#13) and 52 (#20-#23) into a plurality of target domains (in this case, two domains) 41a and 42a, and target devices having the same device address can exist if their target domains are different.

As a result, the number of target devices coupled to the master device 10 (I2C-Master 10) can be extended irrespective of the limited address configuration of the target device.

In this case, it is possible to detect the failure of the I2C-MUX 2 or 2a by the conventional target device failure detection method. That is, failure of the I2C-MUX 2 or 2a is detected by writing a predetermined value in an internal register of a target device, reading a value from the same internal register of the target device, and then comparing the value read with the predetermined value. If the value read coincides with the predetermined value, it is determined that the I2C-MUX 2 or 2a is in a normal state. If the two values are different, it is determined that the I2C-MUX 2 or 2a is in an abnormal state. In this way, the faulty I2C-MUX is detected without fail and it is possible to avoid overlooking the failure of I2C-MUXs.

However, it can be costly to increase the number of I2C-MUXs. Further, in case of a configuration with target device having same device address distributed among various target domains of each I2C-MUX, the conventional target device failure detection method cannot determine whether access to a target device completed normally since a plurality of target devices among target domains of I2C-MUXs might have same device addresses. According to an aspect of the embodiments, it can be determined whether access to a target device completed normally even if a plurality of target device distributed among target domains of one or more I2C-MUXs might have same device addresses, or whether a particular target port (i.e. a target domain) of the I2C-MUX 2 is failing, or whether a particular target device of a target domain is failing, or whether a particular I2C-MUX 2 as an I2C target device is failing, or any combinations thereof.

Figure 4:
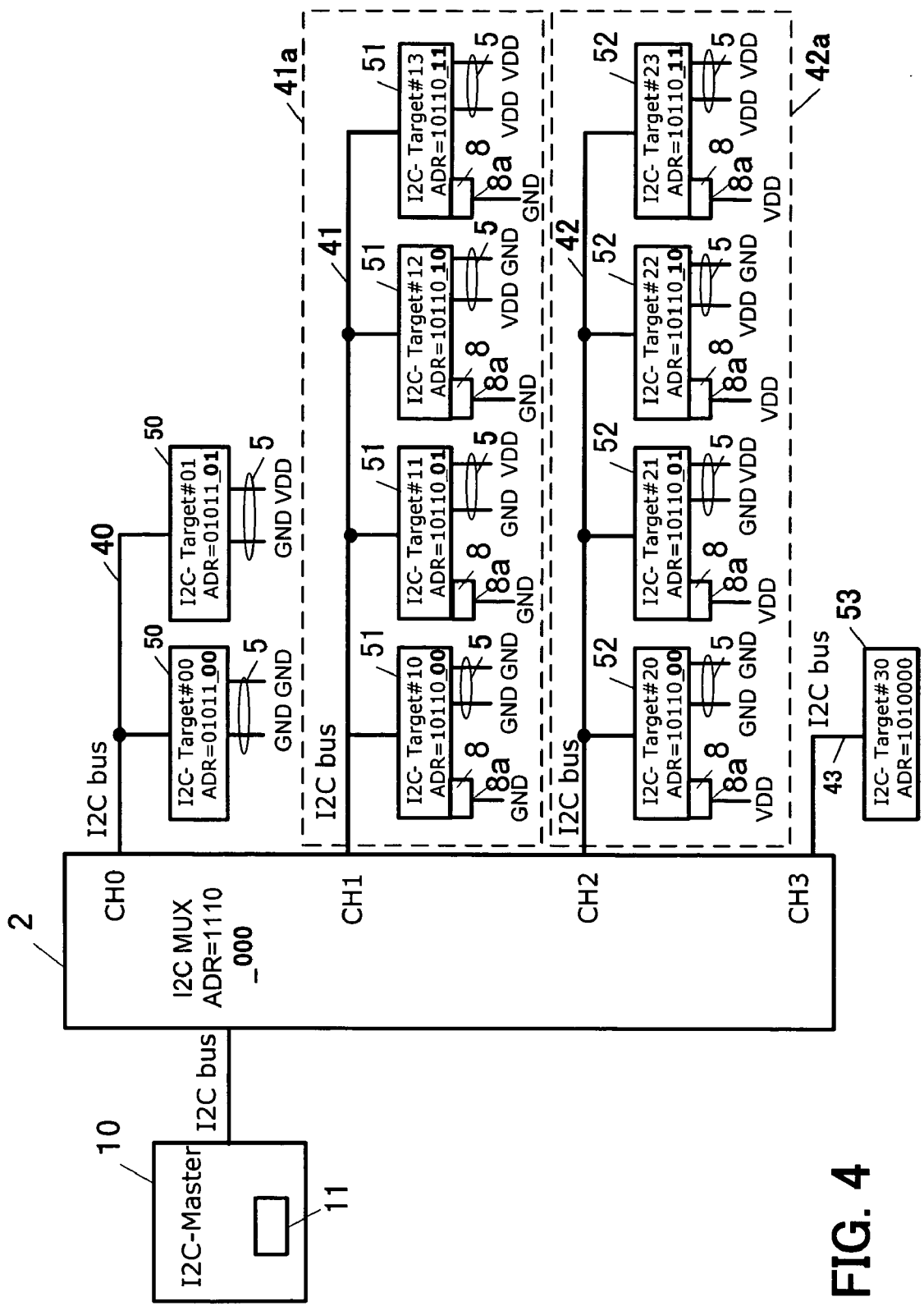
FIG. 4 illustrates an exemplary configuration of a sideband bus setting system according to a second embodiment of the present invention.

FIG. 4 illustrates an exemplary configuration of a sideband bus setting system according to a second embodiment of the present invention, in which many target devices are connected to a sideband multiplexer 2 (I2C MUX 2). In FIG. 4, it is assumed that target devices 51 (#10 to #13) and 52 (#20 to #23) are the ICs of the same type, and the target devices 51 and 52 form target domains 41a and 42a, respectively.

The target domains 41a and 42a are connected to the same I2C-MUX 2. The target devices 51 (#10-#13) connected to a target port CH1 of the I2C-MUX 2 and the target devices 52 (#20-#23) connected to a target port CH2 of the I2C-MUX 2 have the same device addresses respectively, but can exist because the target devices 51 (#10-#13) and 52 (#20-#23) belong to the different target domains 41a and 42a, respectively.

For example, when accessing from the master device 10 to #10 of the target device 51, first, the I2C-MUX 2 is accessed and the internal register 22 of the I2C-MUX 2 is set by the master device 10 so that the target port CH1 becomes effective. Then, #10 of the target device 51 is accessed via the effective target port CH1. However, for example, due to a failure of the I2C-MUX 2, the target port CH2 instead of the target port CH1 may become effective. Then, the access to #10 of the target device 51 is replaced with the access to #20 of the target device 52 which has the same address "10110_ 00". Because these two devices #10 and #20 are the same type, the access is normally completed.

Conventionally, the confirmation of data setting to an internal register 8 of one of target devices 51 and 52 by the master device 10 is performed by writing a predetermined value in the internal register 8 of the target device, reading a value from the internal register 8, and then checking whether the value read coincides with the predetermined value. However, for example, if the above failure of the I2C-MUX 2 is a persistent failure, the command data for confirmation of #10 of the target devices 51 may be received and responded by #20 of the target devices 52, and it is difficult to determine whether the access to the target device has completed normally or not. As a result, the failure of I2C-MUXs may be overlooked.

To solve the above problem, a value identifying a target domain to which a target device belongs is set beforehand to the internal register of each target device. For example, in FIG. 4, target devices 51 (#10-#13) belong to a target domain 41a and target devices 52 (#20-#23) belong to a target domain 42a. So, internal registers 8 of target devices 51 (#10-#13) are set at a value (for example, "0") identifying the target domain 41a, and internal registers 8 of target devices 52 (#20-#23) are set at a value (for example, "1") identifying the target domain 42a. The value identifying a target domain is hereinafter described as a sideband path identification (ID) of a target domain or herein referred to as "a target domain ID".

A target domain ID can be set to the internal register of the target devices 51 and 52 by using a strap pin (external pin). In FIG. 4, a reference numeral 8a indicates strap pins. A value set by a strap pin 8a can be indicated in the internal register 8 that is accessible through the I2C bus. In the case of FIG. 4, strap pins 8a of #10 to #13 of the target devices 51 are connected to GNDs and strap pins 8a of #20 to #23 of the target devices 52 are connected to VDDs. A value of internal register 8, which reflects the value of strap pin 8a in the target device, becomes "0" in the target devices 51 (#10 to #13), and "1" in the target devices 52 (#20 to #23). In this case, the target domain IDs set to the internal registers 8 of the target devices 51 and 52 can be transmitted to the master device 10 through the I2C bus, and the master device can hold the target domain IDs received.

It is also possible that the master device 10 holds the target domain IDs beforehand, and transmits them to the target devices 51 and 52 through the I2C bus. In this case, the target devices 51 and 52 receive the target domain IDs and write the target domain IDs in their internal registers.

In both cases mentioned above, the master device 10 holds the same target domain IDs that have been set to the internal registers 8 of target devices 51 and 52.

When checking a state of I2C-MUX 2, the master device 10 receives a target domain ID from the target device and compares the target domain ID received with the target domain ID held in the master device 10. It is determined that I2C-MUX 2 is normal if the target domain ID received coincides with the target domain ID held in the master device 10, otherwise it is determined that I2C-MUX 2 is in an abnormal state. In this way, the failure of the I2C-MUX 2 is detected before the data-setting process is performed, even if at least two target domains are connected to the same I2C-MUX 2 and the at least two target domains includes some device addresses in common.

For example, when the master device 10 receives the domain ID value "0" (GND) from #10 to #13 of the target device 51 and the same domain ID values "0" are held in the master device 10, the master device can determine that there is no failures occurred.

In the case of FIG. 4, the internal register 8 and strap pin 8a are configured to deal with 1 bit information, but the number of bit information is not limited to this.

Figure 5:
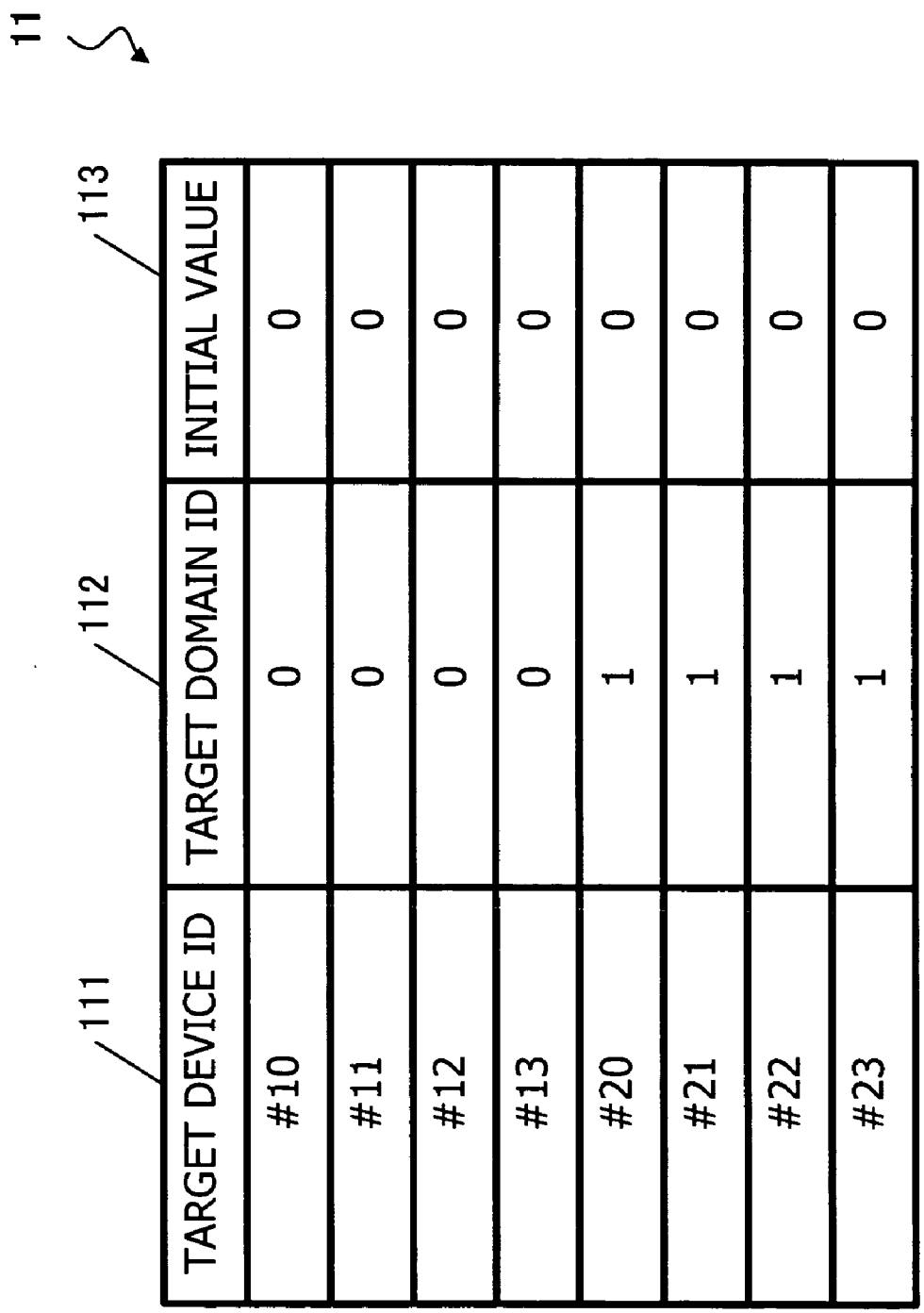
FIG. 5 illustrates an exemplary configuration of target domain defining table 11 according to an embodiment of the present invention.

FIG. 5 illustrates an exemplary configuration of target domain defining table 11 according to an embodiment of the present invention.

In FIG. 5, 111 is a target device ID identifying each target device, 112 is a target domain ID identifying a target domain to which the corresponding target device belongs, and 113 is an initial value needed for the data-setting process to the corresponding target device by the master device 10.

In the case of FIG. 4, a target domain ID 111 for the target domain 41a having target devices 51 (#10-#13) is "0" (GND), meaning that the target devices 51(#10-#13) receive the setting data from the master device 10 through the bus including I2C bus 41 and the target port CH1 of I2C-MUX 2. A target domain ID 111 for the target domain 42a having target devices 52(#20-#23) is "1" (VDD), meaning that the target devices 52 (#20-#23) receive the setting data from the master device 10 through the bus including I2C bus 42 and the target port CH2 of I2C-MUX 2.

Each of the target devices 51 and 52 is in advance provided with the corresponding target domain ID. When checking the state of the I2C-MUX 2, the master device 10 receives the target domain ID from the target devices 51 or 52, and for example, compares the target domain ID received with the target domain ID 111 stored in the target domain defining table 11 of the master device 10, before a data-setting process is performed.

The values (target domain IDs) set to the internal registers 8 of the target devices 51 and 52 may influence the data-setting operation of the target devices 51 and 52. However, because it is possible for the master device 10 to overwrite these internal registers 8 through the I2C buses 41 and 42, there is no problem if an appropriate reconfiguration such as setting of the initial value 113 (for example, "0") needed for data-setting process to the internal register 8 of the corresponding target device is performed prior to the actual data-setting process to the corresponding target device by the master device 10. In other words, the initial value 113 corresponding to the target device ID 111 is set to the internal registers 8 of the target device corresponding to the target device ID 111, just before the data-setting process to the target device corresponding to the target device ID 111 is performed by the master device 10, to avoid the influence of having set the target domain ID 112 to the internal register 8 of the target device in advance.

In this way, it is possible that the failure of the I2C-MUX 2 is surely detected without influencing the data-setting process to the target devices 51 and 52.

Figure 6:
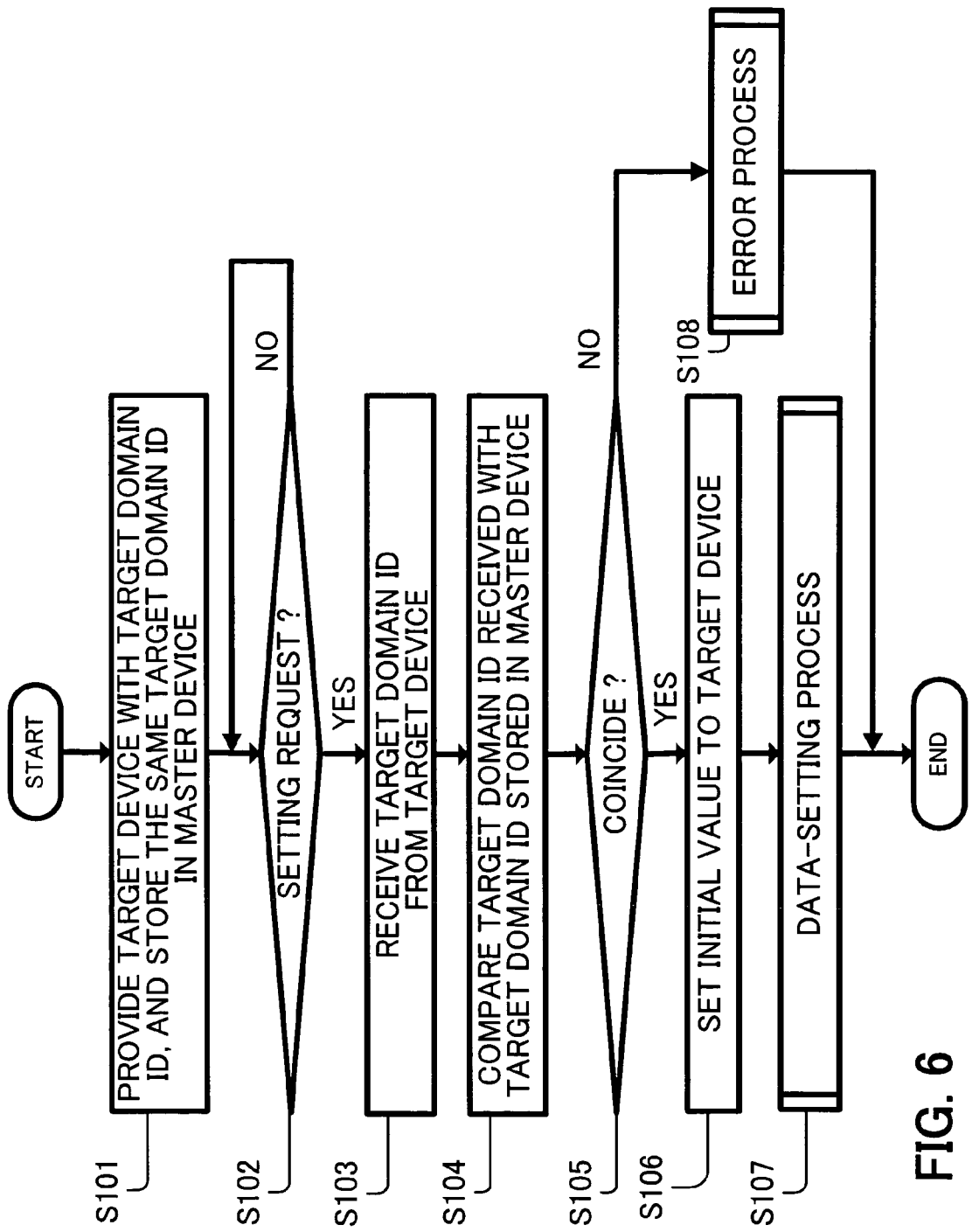
FIG. 6 illustrates a flowchart of sideband bus setting in a master device according to an embodiment of the present invention.

FIG. 6 illustrates a flowchart of sideband bus setting in a master device 10 according to an embodiment of the present invention.

In step S101, each of the target devices 51 (#10-#13) and 52 (#20-#23) of FIG. 4 is provided with a target domain ID. The master device 10 stores the same target domain IDs that have been provided for the target devices 51 and 52, in the target domain defining table 11 (as shown in FIG. 5). The target devices 51 and 52 can be provided with the target domain IDs by receiving them from the master device 10 or by connecting the strap pins 8a of the target devices 51 and 52. The target domain IDs provided are set to the internal registers 8 of the target devices 51 and 52.

In step S102, the master device 10 determines whether a request for a data-setting process to a target device (for example, one of the target devices 51 and 52) has occurred. If the determination in step S102 is YES, the processing proceeds to step S103. If the determination is NO, the processing returns to step S102.

In step S103, the master device 10 receives the target domain ID from the target device, and compares the received target domain ID with the corresponding target domain ID 112 in FIG. 5.

In step S105, the master device 10 determines whether the received target domain ID coincides with the corresponding target domain ID 112 stored in the target domain defining table 11 of the master device 10. If the determination is YES, the sideband multiplexer 2 coupled to the target device is normal and processing proceeds to step S106. If the determination is NO, the processing proceeds to step S108 (error process).

In step S106, the initial value 113 needed for a data-setting process is set to the target device by the master device 10 to perform the data-setting process correctly.

In step S107, the master device 10 performs the data-setting process to the target device, and then the processing is terminated.

In step S108, it is determined that the sideband bus between the master device 10 and the target device has been broken down, and an error process is performed. Then the process is terminated.

According to the feature described above, the failure of the bus, for example the failure of the sideband multiplexer 2, can be detected in advance and it is possible to prevent overlooking the improper data-setting to the target devices.

Figure 7:
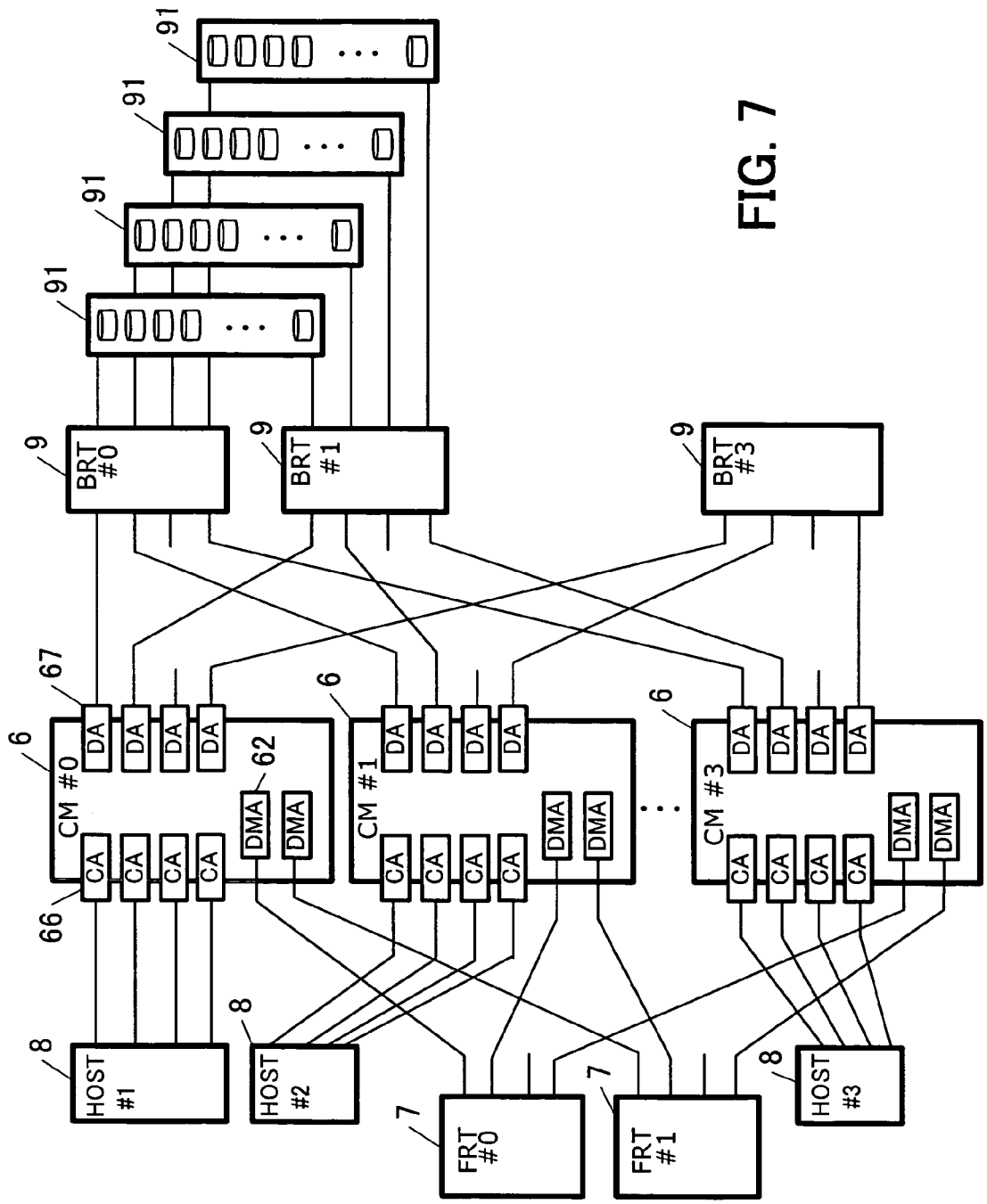
FIG. 7 is an explanatory diagram of a storage system.

FIG. 7 illustrates an explanatory diagram of a storage system.

As an exemplary case in which many I2C target devices of the same type are used, the case of a storage system is described.

In the large storage system, a plurality of units (printed board on which many ICs such as a CPU are mounted) are connected through a backplane.

The storage system is controlled through a plurality of centralized modules CM 6 which control many disc drives 91. The centralized module CM 6 has disk cache and a DMA control circuit 62, and controls a data transfer according to an instruction of a host computer 8. The centralized module CM 6 is connected to the host computer 8 via channel adaptors CA 66 and is connected to the disk drives 91 via drive adaptors DA 67. In the storage system, in order to increase availability, front-end routers FRT 7 and back-end routers BRT 9 are included as units for switching connection routes between the plurality of host computers 8 and the plurality of drives 91.

The centralized module CM 6 and the front end routers FRT 7 are connected through, for example, the PCI-Express interfaces.

Figure 8:
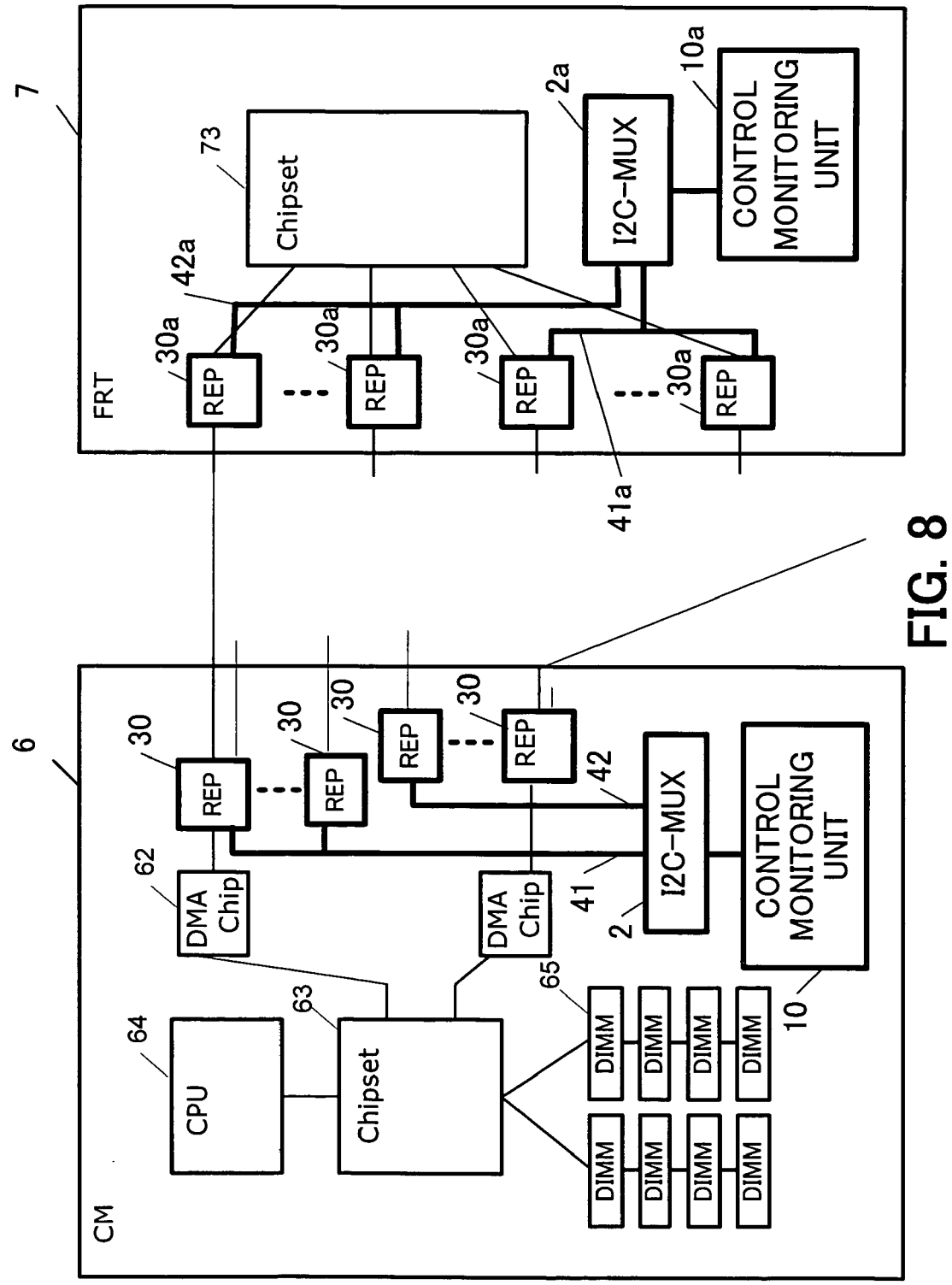
FIG. 8 illustrates an exemplary use of a sideband bus device in the storage system according to an embodiment of the present invention.

FIG. 8 illustrates an exemplary use of a sideband bus device in the storage system according to an embodiment of the present invention.

As shown in FIG. 8, the centralized module CM 6 and the front end routers FRT 7 are connected through, for example, the PCI-Express interfaces. However, because the distance of transmission lines on the backplane is long, in order to correct the signal wave forms, repeater ICs 30 and 30a are respectively mounted on the centralized modules CM 6 and the front end routers FRT 7 as shown in FIG. 8. The backend routers BRT 9 also have the similar configuration.

In FIG. 8, components relating to sideband bus devices in the centralized modules CM 6 and the front end routers FRT 7 are depicted. Some components not relating to sideband bus devices are not shown in FIG. 8.

For example, the centralized module CM 6 includes CPU 64, Chipset 63, DIMMs 65, DMA-Chips 62, and sideband bus related components including multiple repeater ICs 30, sideband bus 41, 42, a control monitoring unit 10, and I2C-MUX 2, where the repeater ICs 30 operate as target devices 50, 51 and the control monitoring unit 10 operates as a master device.

For example, the front end routers FRT 6 includes Chipset 73 and sideband bus related components including multiple repeater ICs 30a, sideband bus 41a, 42a, a control monitoring unit 10a, and I2C-MUX 2a, where the repeater ICs 30a operate as target devices 51, 52 and the control monitoring unit 10a operates as a master device.

By using the control monitoring units 10 (master devices), it is possible to refer to the states of the repeater ICs 30 (target devices) and perform data-setting of the repeater ICs 30, through sideband buses 41, 42 which are connected to I2C-MUX 2. In the same way, by using the control monitoring units 10a (master devices), it is possible to refer to the states of the repeater ICs 30a (target devices) and perform data-setting of the repeater ICs 30a, through sideband buses 41a, 42a which are connected to I2C-MUX 2a.

Figure 9:
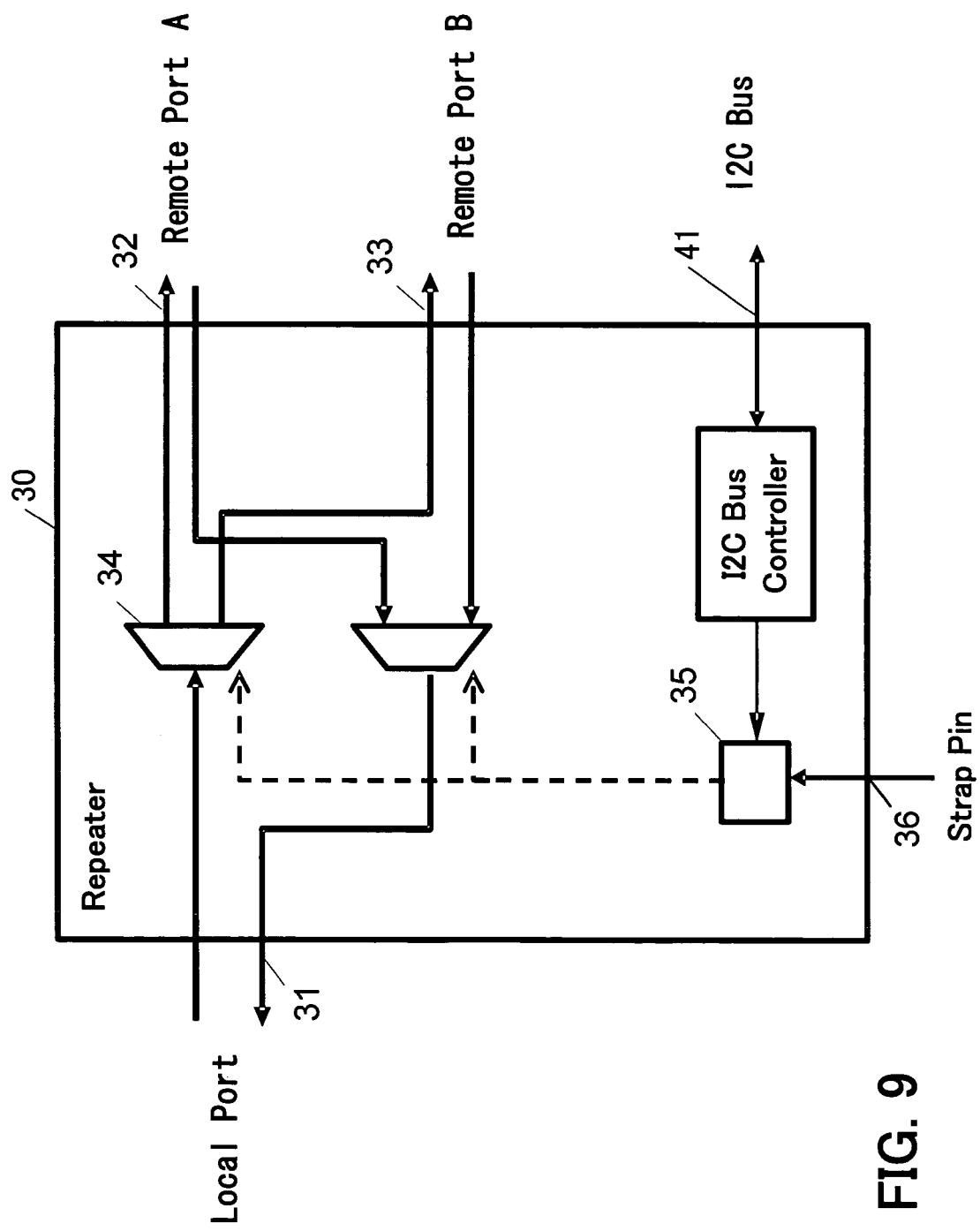
FIG. 9 illustrates a configuration of a repeater IC in the storage system according to an embodiment of the present invention.

FIG. 9 illustrates a configuration of a repeater IC in the storage system according to an embodiment of the present invention.

The configuration of the repeater IC 30 of FIG. 8 is shown as a typical case. The repeater IC 30a of FIG. 8 also has the similar configuration.

The exemplary repeater 30 (for example PM8380 produced by PMC-Sierra. Inc.) has a local port 31 and two remote ports 32 and 33, and selects one of two remote ports 32 and 33 on the basis of the value set to the internal register 35, to connect the local port 31 thereto. Actual data-setting to the internal register 35 can be performed by connecting a strap pin 36 or by setting a value received from the master device 10 through the sideband bus 41 or 42 to the internal register 35.

For example, when a strap pin 36 is connected to GND, a connection between a local port 31 and the remote port A 32 becomes effective, and when the strap pin 36 is connected to VDD, a connection between the local port 31 and a remote port B 33 becomes effective. The value set through the strap pin 36 is reflected in the internal register 35, and by reading the registered value through the I2C bus 41 or 42, it is possible to identify the remote port to which the repeater IC 30 is connected.

Instead of using the strap pin 36, the master device 10 (control monitoring unit 10) can also overwrite the setting data into the internal register 35 through the I2C bus 41 or 42, and can change the above value set through the strap pin 36.

According to an aspect of the present invention, an access error due to a failure of a sideband multiplexer 2 can be detected by the master device 10 (control monitoring unit 10) before the actual data-setting to the target devices 30 (repeater ICs 30) is performed. For example, assuming that the repeater IC 30 serves as the target devices 51, 52 of FIG. 4, strap pins 8a (corresponding to 36 of FIG. 9) of the target devices #10 to #13 are connected to GND and strap pins 8a of the target devices #20 to #23 are connected to VDD. Then, the values of the internal registers 8 (corresponding to 35 of FIG. 9), which mean target domain IDs, become "0" in the target devices 51 (#10 to #13) and "1" in the target devices 52 (#20 to #23). These values of the internal registers 8 (35) can be transmitted to the master device 10 and stored in the master device 10.

The access error due to a failure of a sideband multiplexer 2 in FIG. 4 is such that, for example, the access to target device #10 is received by the target device #20 and the target device #21 responds to the access to the target device #11, and so on for other target devices in relevant target domains. Accordingly, if the target domain ID value received from the target device coincides with the target domain ID value stored in the master device 10, the master device 10 can determine that there is no failure in the I2C bus. After that, the initial values needed for the above mentioned actual data-setting are set to the internal registers 35 before the actual data-setting to the target device 30 is performed. In this way, the master device 10 can detect the access error due to the failure of the sideband multiplexer 2 without influencing the actual data-setting to the target devices 30.

Figure 10:
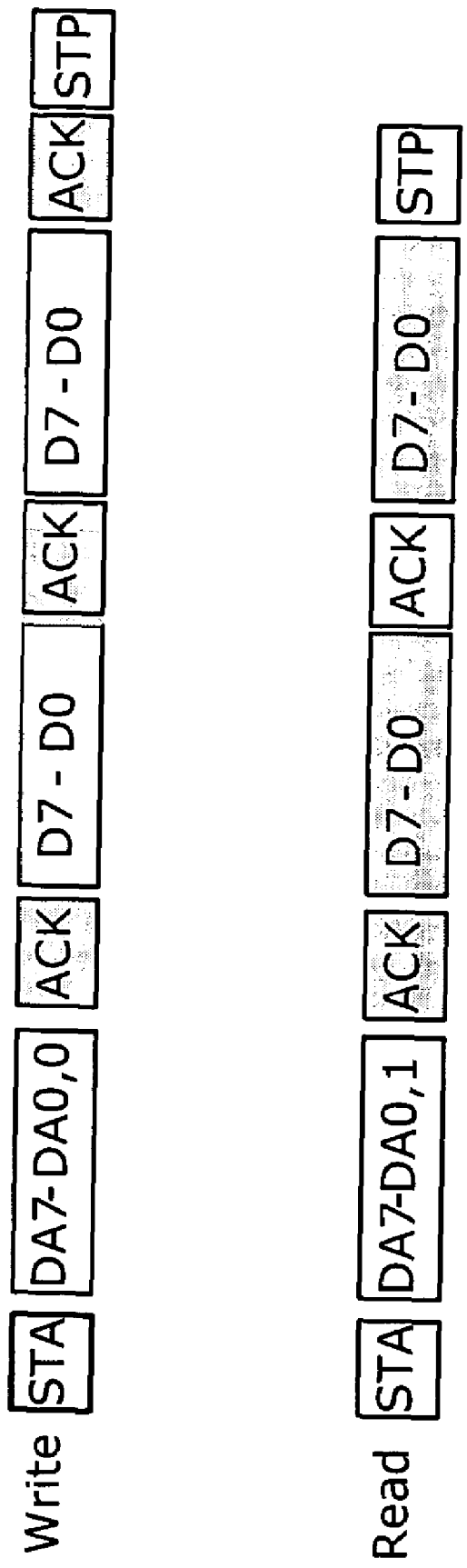
FIG. 10 is an explanatory diagram of an I2C bus control sequence.

FIG. 10 is an explanatory diagram of I2C bus control sequence according to the sideband bus specification disclosed in "The I2C-Bus Specification Version 2.1".

From a Start-bit (STA) transmitted from a master device 10, the flow is started. Sequentially, the master device 10 transmits an 8-bit device address (DA7-DA0) where the device address is 7 bits and the remaining 1 bit is used for a command. If the command is "1", it indicates read, and if "0", it indicates write.

The target device connected to the I2C bus responds with ACK if the address of the target device and the address of the received packet is the same.

Then, if the command is "0" indicating write, the master device sequentially transmits 8-bit data (D7-D0), and the target device receives the data. When the target device completes the reception of the data, the target device responds with ACK once again. When receiving the ACK, the master device can transmit a Stop-bit (STP) and complete the transfer.

If the command is "1" indicating read, the target device sequentially transmits 8-bit data (D7-D0) to the master device 10, and the master device 10 receives the data. When the master device 10 completes the reception of the data, the master device 10 can transmit a Stop-bit (STP) and complete the transfer.

Figure 11:
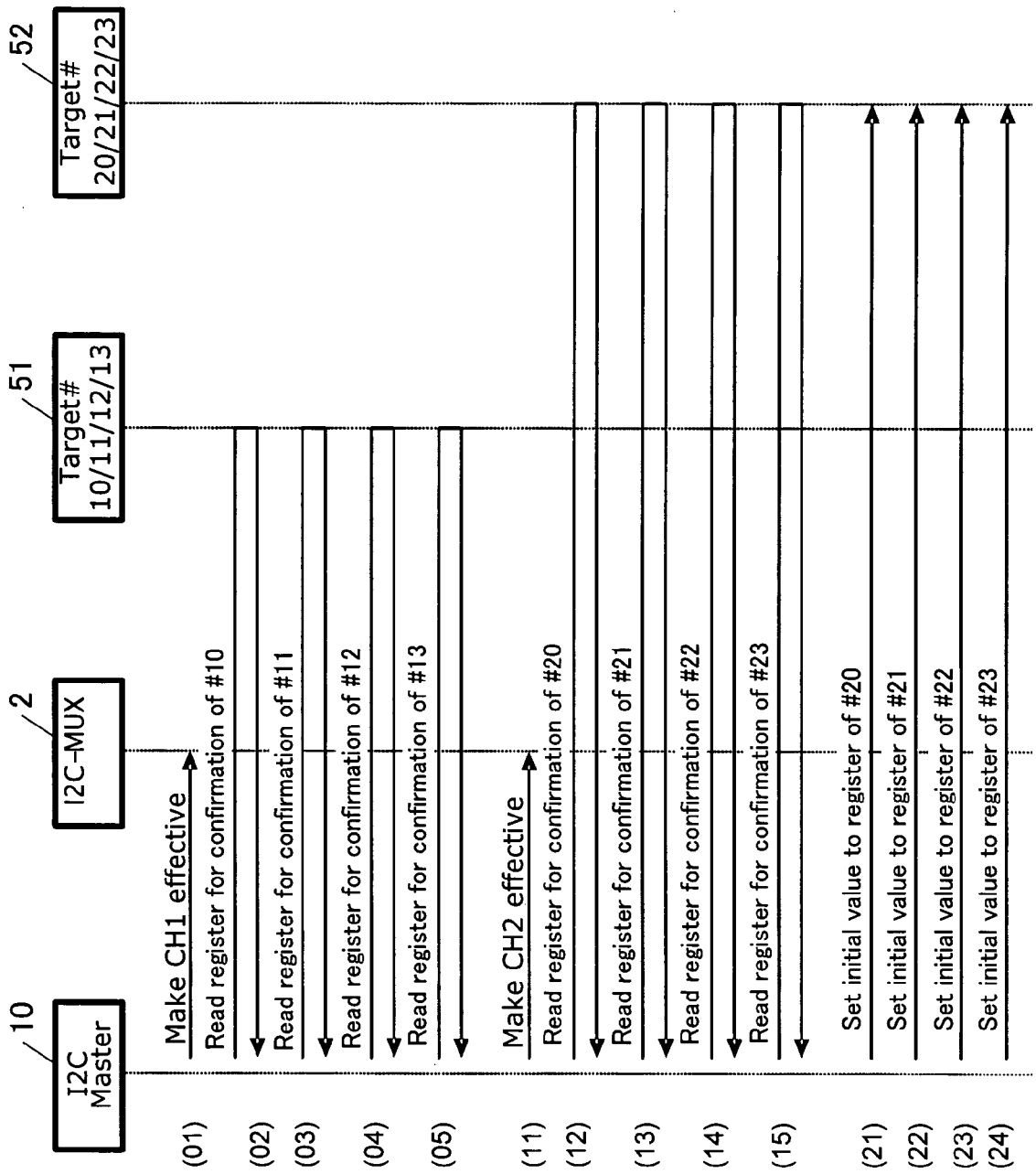
FIG. 11 illustrates an exemplary I2c path diagnosing sequence according to an embodiment of the present invention.

FIG. 11 illustrates an exemplary I2c bus diagnosing sequence according to an embodiment of the present invention.

In this case, an I2C master device 10 diagnoses target devices 51, 52 through I2C-MUX 2 as shown in FIG. 4. Step numbers referring to the confirmation sequence are described in parentheses.

In the case of FIG. 11, first, I2C target devices 51(#10 to #13) are confirmed. Then I2C target devices 52(#20 to #23) are confirmed and initial values are set to I2C target devices 52 (#20 to #23) so that data-setting process to I2C target devices 52 can be performed correctly.

In step 01, the internal register 22 of the I2C-MUX 2 is set so that the target port CH1 of the I2C-MUX 2 becomes effective.

In step 02 to step 05, the master device 10 receives a target domain ID from I2C target devices 51(#10 to #13) connected to the CH1 of the I2C-MUX 2, and compares the received target domain IDs with the target domain IDs stored in the master device 10 to determine whether I2C-MUX 2 is in a normal state or not. If the received target domain ID does not coincide with the target domain ID stored in the master device 10, it is determined that the I2C-MUX 2 is in an abnormal state and the error process is performed.

In step 11, the internal register 22 of the I2C-MUX 2 is set so that the CH2 of the I2C-MUX 2 becomes effective.

In step 12 to step 15, the master device 10 receives a target domain ID from I2C target devices 52(#20 to #23) connected to the CH2 of the I2C-MUX 2, and compares the received target domain IDs with the target domain IDs stored in the master device 10 to determine whether I2C-MUX 2 is in a normal state or not. If the received target domain ID does not coincide with the target domain ID stored in the master device 10, it is determined that the I2C-MUX 2 is in an abnormal state and the error process is performed.

In step 21 to step 24, the internal registers 8 of I2C target devices 52(#20 to #23) are reconfigured to initial values 113 which might be needed for the actual data-setting process, and processing moves to the data-setting process.

According to an aspect of the embodiments, the embodiments are implemented in computing hardware and/or software. The many features and advantages of the embodiments are apparent from the detailed specification and, thus it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A method, comprising:

setting in a target device communicably connected by a bus to a master device, a target domain ID identifying a target domain which is a subgroup of a plurality of target devices;

dividing the plurality of target devices into a plurality of target domains, a unique device address being assigned to each target device in a target domain of the plurality of target domains; and providing a sideband multiplexer connecting the master device to a master port of the sideband multiplexer, and connecting the target domain to one of target ports of the sideband multiplexer, wherein the target domain ID is ID information identifying the target port of the sideband multiplexer to which the target domain is connected;

storing the target domain ID in the master device;

receiving, by the master device, via the bus, the target domain ID from the target device; and performing, by the master device, a data-setting process to the target device when the target domain ID received from the target device coincides with the target domain ID stored in the master device.

2. The method of claim 1, wherein the setting of the target domain ID comprises providing by the master device the target domain ID via the bus, or by a target device strap pin, or any combinations thereof.

3. The method of claim 1, wherein the master device has a target domain defining table including a target domain ID associated with the target devices, and the master device data-setting process further comprises, comparing the target domain ID received from the target device with the corresponding target domain ID stored in the target domain defining table, before the data-setting process to the target device.

4. The method of claim 1, wherein the master device determines the sideband multiplexer is malfunctioning when the target domain ID received from the target device does not coincide with the target domain ID stored in the master device.

5. The method of claim 1, wherein the bus conforms with the Inter-Integrated Circuit (I2C) bus standards.

6. The method of claim 1, wherein the bus conforms with the Two Wire Interface (TWI) standards.

7. A system, comprising:

a target device having an internal register for storing a target domain ID, the target domain ID identifying a target domain which is a subgroup of a plurality of target devices;

a bus;

a master device communicably connected by the bus to the target device, the master device having a target domain defining table for storing the target domain ID associated with the target device, and a sideband multiplexer having a master port and a plurality of target ports, the master port being connected to the master device, each of the plurality of target ports being coupled to the target domain in which each target device has a unique device address, and the target domain ID being ID information identifying the target port of the sideband multiplexer to which the target domain is coupled, wherein the master device receives the target domain ID from the target device via the bus, and performs data-setting process to the target device when the target domain ID received from the target device coincides with the target domain ID stored in the target domain defining table of the master device.

8. The system of claim 7, wherein the master device determines that the sideband multiplexer is malfunctioning when the target domain ID received from the target device does not coincide with the target domain ID stored in the master device.

9. The system of claim 7, wherein the bus conforms with the Inter-Integrated Circuit (I2C) bus standards.

10. The system of claim 7, wherein the bus conforms with the Two Wire Interface (TWI) standards.

11. The system of claim 7, wherein the target device is a repeater IC in a storage system.

12. A master device in communication with a plurality of target devices by a bus, the master device comprising:

a target domain defining table for storing a target domain ID associated with the target devices, the target domain ID identifying a target domain which is a subgroup of the plurality of target devices;

target domain ID sending means for transmitting the target domain ID to the target device via the bus; and target domain ID receiving means for receiving the target domain ID from the target device via the bus, wherein the target domain ID is ID information identifying a target port of a sideband multiplexer to which the target domain is coupled, and the master device performs data-setting process to the target device when the target domain ID received from the target device coincides with the target domain ID stored in the target domain table.

13. A target device in communication with a master device by a bus, the target device comprising:

an internal register for storing a target domain ID identifying a target domain which is a subgroup of a plurality of target devices to which the target device belongs;

target domain ID providing means for providing the internal register with the target domain ID; and target domain ID transmitting means for transmitting the target domain ID stored in the internal register to the master device in response of a request from the master device, wherein the target domain ID is ID information identifying a target port of a sideband multiplexer to which the target domain of the target device is coupled.

14. The target device of claim 13, wherein the target domain ID providing means is a strap pin, and the internal register is provided with a value set by the strap pin as the target domain ID.

15. The target device of claim 13, wherein the target domain ID providing means receives the target domain ID from the master device, and stores the received target domain ID into the internal register.

* * * * *